March 7, 1950
C. J. PLANK
2,499,680
PREPARATION OF SPHEROIDAL DESICCANT
Filed Jan. 22, 1946
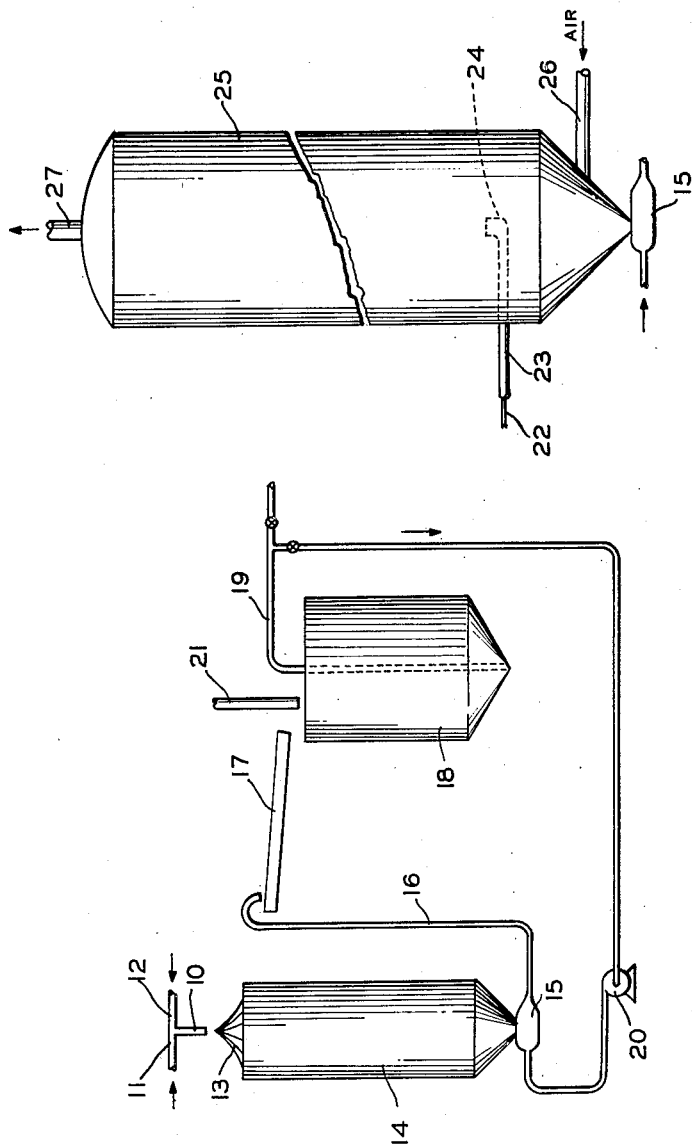
CHARLES J. PLANK
*INVENTOR.*
BY *Oswald G. Hayes*
ATTORNEY Patented Mar. 7, 1950

2,499,680

UNITED STATES PATENT OFFICE 2,499,680

PREPARATION OF SPHEROIDAL DESICCANT

Charles J. Plank, Woodbury, N. J., assignor to Socony-Vacuum Oil Company, Incorporated, a corporation of New York Application January 22, 1946, Serial No. 642,602

1 Claim. (Cl. 252—448)

This invention has reference to a process for preparing inorganic oxide gels characterized by a high degree of desiccating power from hydrogels formed at relatively high pH values. The inorganic oxide of the gel is predominantly silica, but other oxides, particularly metal oxides may be, and preferably are, present.

Gel desiccants heretofore known have been prepared by forming a silica hydrogel at high acidity, on the order of pH 1, washing and drying. Such process is expensive and cumbersome because of the long gelation time at these pH values, namely 12 to 30 hours or more. The sol is prepared by adding water glass with vigorous agitation to an aqueous acid solution to neutralize the caustic of the water glass and form a dilute sol of silica. The sol is retained in the mixing vessel, such as a large tub until gelation occurs and it is then broken up into small pieces for washing and drying. A common method of breaking is to empty the tub onto a wire screen of wide mesh, say ½ to 1 inch openings. This breakage results in a large amount of fines which are generally discarded.

The excessively long gelation time ties up a great deal of expensive plant equipment during lapse of the gelation period. Further, a large amount of labor and/or power is required to move sol and gel about in the plant. Any reduction in gelation time is of obvious commercial importance, but, as shown hereinafter, silica gels formed at higher pH values to reduce the gelation time, have markedly decreased desiccating efficiency.

According to the present invention, this difficulty is overcome and it is made possible to produce silica gel desiccants at high pH value, on the order of 5-10, by soaking the hydrogel in an acid solution having a pH value not substantially greater than 3.5 before drying. Preferably, the gel contains a small amount, not more than about 3%, of a metal oxide during the drying operation. The metal oxide tends to stabilize the gel against breakage during drying.

An important advantage of the invention is that it makes feasible preparation of spheroidal pellets of high desiccating power by the "bead" technique described and claimed in Patent No. 2,384,946, issued September 18, 1945, to Milton M. Marisic. Because of the short gelation time now made available in preparation of desiccants, the hydrogel may be prepared in any desired form by moulding or by suspending the sol in a suitable medium such as a mineral oil fraction or air to induce gelation in the form assumed by small amounts of sol. Such techniques offer marked advantages in that the hydrogel may be washed and dried without breaking up, thus preserving the smooth surfaces and high mechanical strength of the gel unimpaired.

It is accordingly a principal object of this invention to produce desiccant grade silica gels or plural oxide gels in which silica constitutes at least about 97% by weight of the total oxide content of the gel under conditions which permit of low acidity of the sol and hydrogel. A further object is gelation of sols to produce such gels as small masses, say capable of passing through a one inch mesh and thereafter washing and drying the small masses of gel while substantially retaining the form assumed at gelation whereby the final hard dry gel is possessed of smooth surfaces and maximum strength. Since the bead technique is typical of this type of gel formation, it will be discussed herein as exemplary, but without intention to limit the invention thereto.

The bead process, and other processes such as spraying and casting or molding, wherein the form assumed at the time of gelation is retained through the drying step present major advantages in preparing gel pellets since the process is inherently economical both as to time consumed and as to loss in the form of fines or dust. The product thereof is relatively uniform and highly resistant to breakage and abrasion losses in use.

In order to achieve these and other objects and advantages, the gel is prepared from a sol having a pH value approximately within the range 5 to 10. Best results are obtained at about pH 6 to 8.5. Between these limits, the sol may be readily controlled to have a desired gelation time. Other factors affecting gelation time are temperature and "product concentration," i. e. the relative amount of water insoluble inorganic oxide in the gel as measured by the weight after washing and drying. Gelation time decreases with increases in either temperature or product concentration. By proper mutual adjustment of pH, temperature and product concentration, sols may be prepared having any desired gelation time from a fraction of a second up. The principal difficulty is usually found in the step of mixing reactants to form the desired sol. For batch mixing, a water glass solution may be added to an acid solution with vigorous agitation to produce a clear sol which sets to a firm gel upon passage of time. In its preferred embodiments, the present invention contemplates flowing the two solutions into confluence and mixing as they flow together. This may be done adequately for most sols by simultaneously feeding the two (or more) reactant solutions into a tube which may also function as a nozzle to feed the resultant sol to any suitable forming means, such as a body of oil or molds. In general, care should be taken to avoid adding acid solution to a body of water glass, since this usually results in formation of a gelatinous precipitate, no matter how vigorous the agitation. Where the reactants are so proportioned that the whole mass thereafter sets to a gel including the precipitate, such mixing can be tolerated, although the resultant product is thereby rendered weaker and less homogenous.

After the hydrogel has been formed, the same is soaked in an acidic solution having a pH value of less than about 3.5 and preferably less than 2. Silica is insoluble in acidic solutions generally and it appears that any aqueous acid may be employed, except, of course, hydrofluoric. No maximum concentration of acid has been found, but relatively dilute solutions on the order of 1 normal to pH 2 are preferred because of the lower acid cost. The acid solutions contemplated by the invention as soaking media do have a tendency to dissolve metal oxides and if such oxides are desired in the gel to inhibit breakage during drying, care should be exercised during the soaking step. The acidic solution may itself contain metal salts to impregnate the gel or the operation may be controlled to remove only a portion of the metal oxide content of a gel having an excess of that component. Serious difficulty is not normally encountered on this score unless the gel is washed for a prolonged period with a strong acid. For example, alumina may be largely removed by flowing a normal solution of hydrochloric acid through the gel for several days. But if the soaking is done with a static pool of acid, sufficient alumina for the desired purpose will generally be retained in the gel even after prolonged soaking.

The acid treatment is preferably begun promptly after formation of the hydrogel, since it is found that the desiccant power is improved to a greater extent thereby. Delay reduces the effectiveness of the acid soaking but does not completely destroy it. The invention therefore contemplates an acid soaking at any convenient time before drying of the hydrogel to prepare the finished dry gel, with a marked preference for prompt initiation of the acid soaking. The acidic solution may be a solution of an acid in water, for example, aqueous hydrochloric, sulfuric, phosphoric, trichloracetic, and the like or it may be a solution of an acid salt such as ammonium acid sulfate or a salt which hydrolyzes to yield acidic solutions, for example, aluminum sulfate, beryllium nitrate, ferric chloride, cobalt nitrate, zirconyl chloride, etc. In the latter case, the metal oxide desired for inhibiting breakage may be conveniently impregnated in a gel from the acid soaking solution. Aqueous solutions of acids are relatively ineffective at pH values above about 2 in that long periods of time are required to achieve the desired effect. The acidic salts solutions may be used efficiently at pH values up to 3.5.

Apparatus for practicing the invention is shown in the annexed drawings, wherein;

Figure 1 is a diagrammatic representation of means for continuously forming hydrogel beads in a water immiscible liquid and sluicing the same to a tank for soaking in acid, and Figure 2 is a similar showing of means for forming small hydrogel beads in a gaseous medium.

Where it is desired to form spheroidal particles of gel, that purpose is advantageously achieved by forming a clear hydrosol having the inherent capacity to set to a firm hydrogel by the lapse of a proper interval of time. That sol is introduced to a gaseous medium or to a water immiscible liquid medium as a plurality of globules or droplets or as a spray and retained in the medium until gelation takes place to form firm spheroids of hydrogel. The conditions of gelation are such that the gelation proceeds without disruption of the particles. Thus all the components of the sol are retained during gelation. For example, a conventional spray drying operation is unsuitable where a gaseous medium is used because rapid drying during gelation tends to break up the gel. A drying which does not break the gel globules is not objectionable, but the gel is preferably fully set before any substantial drying takes place. It is therefore preferred that the gelling medium be maintained at a temperature below the boiling point of water. Addition of small amounts of some substance foreign to the sol is not generally objectionable. Thus a gaseous medium may contain ammonia to hasten gelation and for similar reasons, amino compounds or the like may be dissolved in an oil used for gelation.

Referring specifically to Figure 1, a bead form hydrogel is prepared from a clear hydrosol formed in mixing nozzle 10 by mixing therein of two reactant solutions supplied by pipes 11 and 12. The hydrosol is discharged onto the apex of a fluted conical divider 13 which splits it into a plurality of streams which are then introduced into a body of a water immiscible liquid such as gas oil, in forming tower 14. The oil overlies a body of water in the bottom of tower 14, from which firm hydrogel beads, formed by gelation of the sol in the oil, are discharged by entrainment in water or aqueous solution in injector 15. The hydrogel beads are carried by the stream of water through pipe 16, discharging in sluice 17, from which the water and entrained beads flow to washing tank 18. Excess water flows from tank 18 through pipe 19 to be recirculated by pump 20 to the injector 15.

The acid treatment of the hydrogel is advantageously begun during the passage to the wash tank 18 by providing a solution of aqueous acid in the circuit described. After a suitable acid treatment by allowing the hydrogel beads to remain in an acid solution in tank 18; a washing cycle is begun by flowing a wash solution through pipe 21 into tank 18 and withdrawing wash water through pipe 19. Preferably, the gel is washed in a series of tanks 18, with fresh water entering the tank which has been in the washing cycle for the greatest time and withdrawing spent water from the most recently added tank in the series.

The hydrogel beads may also be formed by spray gelling, for example in the apparatus of Figure 2. Two solutions which react to yield a gelable sol having a short gelation time, for example about five seconds, are introduced by concentric pipes 22 and 23 to a mixing and spraying nozzle 24 within a chamber 25. The sol is prepared by rapidly mixing the two solutions to form the sol which is immediately sprayed into the chamber. Preferably the sol is sprayed upwardly from the bottom in order that the sol shall have a longer time in the air and thus decrease the size of chamber required. The sol and the air into which it is sprayed are preferably maintained below the boiling point of the sol in order to inhibit boiling of the sol, thus disrupting the gel at the time of formation. If desired, air may be passed in through pipe 26 and out by pipe 27. Ammonia added to the air so circulated tends to accelerate gelation.

The gelled spheroids so formed may be collected in any suitable manner and immersed in an acid solution in accordance with the principles of the invention. A preferred method is maintenance of a pool of acid solution in the bottom of chamber 25 into which the spheroids are collected for withdrawal by injector 15 for sluicing to a treating and washing tank as in Figure 1.

The gel may also be formed in molds or in large masses which are broken up for further processing as known in the art.

EXAMPLE I

For purposes of comparison, a sample of commercial "bead catalyst" was tested for desiccating power. The beads were prepared by flowing together and mixing an aqueous solution containing 158 grams per liter $SiO_2$ (obtained by dissolving "N" brand sodium silicate, 9.1% $Na_2O$, 28.9% $SiO_2$) with an aqueous solution containing 39.4 grams aluminum sulfate and 28.6 grams sulfuric acid per liter to form a hydrosol which was then injected into gas oil in a forming tower as shown in Figure 1. The resulting hydrogel beads were soaked in equilibrium water at 95° F. for 36 hours and then washed for 60 hours with a dilute solution of aluminum sulfate (pH=3.0) and were then freed of soluble salts by water washing. The bead hydrogel was then dried at 350° F. The usual step of kiln drying at 1275° F. was omitted. It was found that the desiccating power of this gel is very low in the 20-60% humidity range, all tests in this and succeeding examples being based on weight per cent water absorbed by the gel at 77° F. at equilibrium with air of the specified humidity. Desiccating power and percentage composition, where stated, are based on oven-dry (350° F.) gel. In the case of the beads described in this example (approx. 9% $Al_2O_3$, 91% $SiO_2$) the desiccating power was stated in Table I.

TABLE I

*Desiccating power of commercial bead catalyst (oven dry)*

|  | Relative Humidity | | | | |
| --- | --- | --- | --- | --- | --- |
|  | 10 | 20 | 40 | 60 | 80 |
| Bead Catalyst | 5.2 | 7.1 | 11.7 | 21.1 | 43.7 |

EXAMPLE II

A sample of hydrogel beads prepared as above was taken direct from the forming tower and aged in water for about one week at room temperature. These beads were then soaked three times for 2 hour intervals in 1 N HCl solutions. A fourth treatment with 1 N HCl was carried out overnight, all these treatments being at room temperature. The beads were then washed free of chloride ions and then air-dried at about 300° F. for several hours.

On testing the desiccating capacity of these beads it was found that they absorbed 6.2, 9.0 and 15.8 wt. per cent $H_2O$ at 10, 20 and 40% relative humidity, respectively. This shows a very definite improvement over Example I.

Subsequent analysis of these beads showed that they contained approximately 3% $Al_2O_3$ as compared to about 7% which they contained prior to the acid treatment.

EXAMPLE III

The source of the silica for this and subsequent examples was "N" brand water glass diluted to a concentration of 0.211 gram $SiO_2$/cc.

Two solutions were prepared. Solution (1) was composed of 125 cc. water glass (0.211 gram $SiO_2$/cc.) and 225 cc. $H_2O$. Solution (2) was composed of 73.5 cc. 3.52 N HCl, 37 cc. of 10% $CaCl_2$ solution, and 64.5 cc. $H_2O$. These two solutions were mixed with very rapid mechanical agitation giving a clear sol with pH=6.5 and gel time=1 min.

After gelation the batch was divided into halves, labelled A and B. Part A was treated with 4 portions of 1 N HCl. Three of these treats were of 2 hours duration and the fourth of overnight length. Following this the gel was washed free of chloride ion and then oven-dried at 300° F. for several hours. Portion B was merely washed free of chlorides and then air-dried for several hours at 300° F.

Table II shows a comparison of the desiccating properties of portions A and B. It is immediately apparent that portion B had extremely poor desiccating power while portion A was much more efficient.

TABLE II

*The effect on desiccating power of acid treating $SiO_2$-$CaCl_2$ hydrogel*

|  | 10 | 20 | 40 |
| --- | --- | --- | --- |
| Portion A (acid treat) | 6.3 | 10.7 | 20.9 |
| Portion B (no acid treat) | 2.0 | 2.9 | 4.6 |

Subsequent analysis showed portion A to contain only silica and portion B to contain 1% CaO, no chloride being present in either portion.

EXAMPLE IV

$SiO_2$-$Fe_2O_3$ Gel

Two solutions were prepared. Solution (1) contained 116 cc. water glass (0.211 gram $SiO_2$/cc.) and 212 cc. $H_2O$, while solution (2) contained 61.5 cc. 3.52 N HCl, 10 cc. $Fe(NO_3)_3$ (0.05 gram $Fe_2O_3$/cc.) and 100 cc. $H_2O$. These solutions were mixed thoroughly with very rapid mechanical agitation and gave a clear sol with pH=6.3 and gel time=1 min. After gelation, the batch was divided into halves. Portion A was treated 4 times with 1 N HCl as in Example III. Portion B was treated in the same way with 1% $NH_4Cl$ solution. Following this both portions were washed free of chloride ion and then air dried to 300° F.

Table III shows a comparison of the drying properties of these two batches. These results show a very great improvement in drying power brought about by the acid treatment.

TABLE III

*The effect of acid treatment on the drying power of $SiO_2$-$Fe_2O_3$ gel*

|  | Relative Humidity | | |
| --- | --- | --- | --- |
|  | 10 | 20 | 40 |
| Portion A (acid treated) | 4.2 | 7.1 | 16.0 |
| Portion B (no acid treat) | 0 | 1.9 | 8.1 |

EXAMPLE V

$SiO_2$-$ZrO_2$ Gel

Two solutions were prepared. Solution (1)

contained 116 cc. water glass (0.211 gram $SiO_2$/cc.) and 250 cc. $H_2O$. Solution (2) contained 3.5 cc. $ZrOCl_2$ solution (0.145 gram $ZrO_2$/cc.), 60 cc. 3.86 N HCl and 70 cc. $H_2O$. The two solutions were thoroughly mixed with rapid mechanical stirring to give a clear sol with pH=6.3 and gel time=1 min. After gelation the batch was divided into halves. Portion A received 4 treatments with 1 N HCl (as for portion A in Example III), while portion B was treated in the same way with 1% $NH_4Cl$ solution. Following this both portions were washed free of chloride ions and then air dried for several hours at 300° F.

TABLE IV

*The effect of acid treatment on the drying power of $SiO_2$-$ZrO_2$ gel*

|  | Relative Humidity | | |
|---|---|---|---|
|  | 10 | 20 | 40 |
| Portion A (acid treated) | 6.5 | 11.0 | 22.9 |
| Portion B (no acid treat) | 4.0 | 6.3 | 12.7 |

Table IV shows a comparison of the drying properties of these two batches. Here again the effectiveness of the acid treatment in improving the desiccant properties of the gel is evident.

Subsequent analysis showed portion A to contain 1.9% $ZrO_2$.

EXAMPLE VI

SILICA GEL

Two solutions were prepared. Solution (1) contained 472 cc. water glass (0.211 gram $SiO_2$/cc.) and 1000 cc. $H_2O$. Solution (2) contained 282 cc. 3.52 N HCl and 246 cc. $H_2O$. These solutions were cooled to about 4° C. and then thoroughly mixed with rapid mechanical agitation to give a clear sol with pH 6.2 and gel time 2 min. at 9° C. After gelation this gel was treated with 2% $Al_2(SO_4)_3 \cdot 18H_2O$ (pH=3.4) three times for two hour periods and once overnight. The gel was then washed free of sulfate ions and then air dried for several hours at 300° F.

Testing this gel for its desiccating power showed that it absorbed 5.9, 9.9 and 22.8 wt. per cent $H_2O$ at 10, 20 and 40% relative humidity.

Subsequent analysis showed this gel to contain approximately 1% $Al_2O_3$.

EXAMPLE VII

SILICA GEL

Two batches of gel were prepared in an identical manner. The following proportions are those for a single batch. Two solutions were prepared. Solution (1) contained 500 cc. water glass (0.211 gm. $SiO_2$/cc.) and 670 cc. $H_2O$. Solution (2) contained 270 cc. HCl (3.72 N) and 670 cc. $H_2O$. Both solutions were cooled to about 5° C. and then solution (1) was added to solution (2) with vigorous mechanical agitation. The resulting sol had a gel time of 1 minute and a pH=6.9.

Batch A was treated immediately with 0.1 N HCl in the manner of acid treatment used in the previous experiments. Batch B was treated similarly with a solution of 1% $NH_4Cl$. The results shown in Table V clearly demonstrate a very great improvement in desiccating power brought about by the acid treatment.

TABLE V

*The effect of acid treating $SiO_2$ hydrogel*

|  | Relative humidity | | |
|---|---|---|---|
|  | 10 | 20 | 40 |
| Batch A (acid treated) | 4.1 | 8.1 | 19.5 |
| Batch B ($NH_4Cl$ treated) | 1.5 | 2.6 | 4.8 |

I claim:

A process for preparing spheroidal gel desiccant pellets which comprises forming a hydrosol of water insoluble inorganic oxide having a pH value of about 5 to about 10, predominating in silica and characterized by an inherent capacity to set to a hydrogel upon the lapse of a suitable period of time, admitting said sol in the form of separate globules to a body of a fluid medium immiscible with said hydrosol in which said globules assume spheroidal shape due to surface tension at the interface between said sol and said fluid medium, retaining said spheroidal globules in said medium until gelation occurs, retaining in said globules substantially all the constituents of said sol until gelation occurs, passing gel spheroids from said fluid medium into an aqueous solution of an acid having a pH value not greater than about 2, flowing said solution of acid to an enlarged zone filled with said aqueous solution of an acid, withdrawing said solution from said enlarged zone and passing the solution so withdrawn to the point at which gel spheroids pass from said immiscible liquid into said acid solution to supply the flowing acid solution for conveying additional gel spheroids to said enlarged zone, washing gel spheroids which have been acid treated as aforesaid to remove water soluble salts therefrom and drying the washed and acid treated spheroids; the water insoluble inorganic oxide content of said hydrogel at the time of drying being constituted by at least about 97 per cent silica and the balance water insoluble metal oxide.

CHARLES J. PLANK.

REFERENCES CITED

The following references are of record in the file of this patent:

UNITED STATES PATENTS

| Number | Name | Date |
|---|---|---|
| 1,665,264 | Holmes et al. | Apr. 10, 1928 |
| 2,080,066 | Sheppard et al. | May 11, 1937 |
| 2,229,353 | Thomas et al. | Jan. 21, 1941 |
| 2,331,353 | Stoewener et al. | Oct. 12, 1943 |
| 2,384,943 | Marisic | Sept. 18, 1945 |
| 2,384,946 | Marisic | Sept. 18, 1945 |
| 2,387,596 | Marisic | Oct. 23, 1945 |
| 2,400,465 | Marisic | May 14, 1946 |
| 2,442,884 | Webb et al. | June 8, 1948 |